United States Patent
Bretl et al.

(10) Patent No.: US 6,798,361 B1
(45) Date of Patent: Sep. 28, 2004

(54) E-VSB MAIN STREAM PACKET JITTER REMEDIATION

(75) Inventors: Wayne E. Bretl, Grayslake, IL (US); Timothy G. Laud, Libertyville, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 10/729,640

(22) Filed: Dec. 5, 2003

(51) Int. Cl.[7] .................................................. H03M 7/00
(52) U.S. Cl. .............................................. 341/50; 341/51
(58) Field of Search ........................... 341/50, 51, 67

(56) References Cited

U.S. PATENT DOCUMENTS 6,563,436 B2 * 5/2003 Fimoff et al. ................. 341/50

OTHER PUBLICATIONS

A. Roger Hammons, Jr. et al., "The $Z_4$–Linearity of Kerdock, Preparata, Goethals, and Related Codes", IEEE Transactions on Information Theory, vol. 40, No. 2, Mar. 1994, pp. 301–319.

* cited by examiner

*Primary Examiner*—Brian Young
*Assistant Examiner*—Joseph Lauture

(57) ABSTRACT

A field transmitted by a transmitter and received by a receiver has a map indicating the number of E-VSB segments and VSB segments in the field. The E-VSB segments contain E-VSB data, and the VSB segments contain VSB data. The VSB data includes video and/or audio data. The audio data in the field is limited to a predetermined data rate when the VSB data in the field has a VSB bit rate below a predetermined threshold. This limit reduces or eliminates audio related jitter in the receiver.

34 Claims, 4 Drawing Sheets

E-VSB MAIN STREAM PACKET JITTER REMEDIATION

RELATED APPLICATIONS

This application contains disclosure similar in part to U.S. application Ser. No. 10/674,191 filed Sep. 29, 2003, which is a continuation-in-part of U.S. application Ser. No. 10/663,953 filed Sep. 16, 2003, which is a continuation-in-part of U.S. application Ser. No. 10/368,737 filed Feb. 18, 2003, which is continuation-in-part of U.S. application Ser. No. 10/345,609 filed Jan. 16, 2003, which is a continuation-in-part of U.S. application Ser. No. 10/282,394 filed Oct. 29, 2002, which is a continuation-in-part of U.S. application Ser. No. 10/011,333 filed Dec. 3, 2001, which claims the benefit of U.S. Provisional Application No. 60/324,096 filed on Sep. 22, 2001. U.S. application Ser. No. 09/804,262 also contains disclosure similar in part to disclosure of this application.

TECHNICAL FIELD OF THE INVENTION

The present invention relates to the control of the main stream audio rate in frames containing both VSB data and E-VSB data so as to limit audio related jitter in a receiver.

BACKGROUND OF THE INVENTION

The ATSC digital television standard presently provides for the transmission of successive data fields each comprising 313 segments extending over a 24.2 ms time interval. FIG. 1 discloses an exemplary format for a data field according to this standard. The first segment of each field is a field sync segment. The field sync segment is composed of four two-level segment sync symbols and space for 828 other two-level symbols. A portion of this space is used for a field sync, and another portion of this field is reserved. Except for the reserved portion, and an alternating polarity 63 symbol PN sequence, the information in the frame sync segment does not change from field to field. Each of the remaining 312 segments (numbered 0 through 311) of each field comprises four two-level segment sync symbols and 828 n-level data symbols where n is currently eight, although n could be other integers such as two, four, sixteen, etc. Except for the segment sync portion, it is highly likely that the data in the remaining segments of the fields change from field to field.

As indicated by U.S. patent application Ser. No. 09/804,262 filed on Mar. 13, 2001, there is presently some interest in extending the ATSC digital television standard to allow a field to contain a mix of more robustly coded data (referred to herein as E-VSB data) and the data currently provided for in the standard (referred to herein as VSB data). Preferably, the data mix is employed on a segment-by-segment basis such that, ignoring the effects of interleaving in the encoder, some segments of a field are used to transmit VSB data exclusively and the remaining segments of the field are used to transmit E-VSB segments exclusively. However, it is possible that all data segments of a field could contain either E-VSB data segments exclusively or VSB data segments exclusively. Moreover, it is also possible that the E-VSB data contained in some segments of a field may be coded with one robust coding rate and that the E-VSB data in other segments of the field may be coded at other robust coding rates.

As disclosed in the above mentioned '262 application, a map that indicates which segments contain the more robust (E-VSB) data and which segments contain standard VSB data is preferably provided by the transmitter to the receiver so that the receiver can properly decode and otherwise process the received VSB and E-VSB data. Assuming that a field contains E-VSB data at different coding rates, the map in that case must also designate the coding rates that apply to the differently coded E-VSB data segments.

The '262 application describes one mapping system. Co-pending U.S. patent application Ser. No. 10/011,900 filed Dec. 3, 2001 as well as the '333 application describe another mapping system that reliably identifies which segments contain first data (such as VSB data) and which segments contain second data (such as E-VSB data).

The '953 application cited above discloses another map configuration in which maps are used to indicate allowed mixes of E-VSB segments in a field. The packing or distribution of these E-VSB segments in a field can produce jitter in the received signal. This jitter is caused by the non-uniform distribution of the E-VSB segments throughout the field. The '191 application discloses how to pack or distribute E-VSB segments in a field so as to reduce jitter.

However, there is still a potential for packet jitter problems to occur in receivers with unrestricted use of E-VSB. The tradeoff of packets between the VSB streams and E-VSB streams can cause displacement of packets relative to a purely uniform spacing. This displacement tends to increase in the VSB stream as the percentage of E-VSB data segments increases. In other words, as the percentage of E-VSB data segments increases, the VSB data rate gets small, and when the VSB data rate gets small, the packets tend to group together. These packet bursts are a form of jitter which can cause problems with receiver decoder buffers. The present invention is directed to an implementation to reduce or eliminate this jitter.

SUMMARY OF THE INVENTION

In accordance with one aspect of the present invention, a method of transmitting a field comprises the following: generating a map for the field, wherein the map indicates the number of E-VSB segments and VSB segments in the field; inserting the map into the field; inserting E-VSB data into the E-VSB segments of the field; inserting VSB data into VSB segments of the field, wherein at least one of the VSB data and the E-VSB data includes audio data; limiting the audio data in the at least one of the VSB data and the E-VSB data to a predetermined data rate in response to the corresponding VSB data rate or E-VSB data rate being below a predetermined threshold; and, transmitting the field.

In accordance with another aspect of the present invention, a method of recovering data from a signal comprises the following: receiving the signal containing a field; demodulating the received signal to develop a demodulated signal containing a map indicating the number of E-VSB segments and VSB segments in the field, wherein the E-VSB segments contain E-VSB data, wherein the VSB data segments contain VSB data, wherein the VSB data includes audio data, and wherein the audio data is limited to a predetermined data rate in response to a VSB data rate below a predetermined threshold; de-formatting the field according to the map so as to separate the VSB segments and the E-VSB segments; and, processing the VSB data in the separated VSB segments in a VSB processor, the processing including buffering the VSB data in a buffer having a size which, in conjunction with the limit of the predetermined data rate, reduces audio jitter.

In accordance with still another aspect of the present invention, a receiver for recovering data from a signal comprises a tuner, a demodulator, a segment de-formatter, and a processor. The tuner is arranged to tune to the signal containing a field. The demodulator is arranged to demodulate the received signal to develop a demodulated signal containing a map indicating the number of E-VSB segments and VSB segments in the field. The E-VSB segments contain E-VSB data, the VSB data segments contain VSB data, the VSB data includes audio data, and the audio data is limited to a predetermined data rate in response to a VSB data rate below a predetermined threshold. The segment de-formatter is arranged to de-format the field according to the map so as to separate the VSB segments and the E-VSB segments. The processor is arranged to process the VSB data in the separated VSB segments in a VSB processor, and the processor includes a buffer having a size which, in conjunction with the limit of the predetermined data rate, reduces audio jitter.

BRIEF DESCRIPTION OF THE DRAWINGS

These and other features and advantages of the present invention will become more apparent from a detailed consideration of the invention when taken in conjunction with the drawings in which:

FIG. 6 provides examples of the MAP numbers for various combinations of 1/4 rate steps and 1/2 rate steps in a bursted packing pattern; and, FIG. 7 provides examples of the MAP numbers for various combinations of 1/4 rate steps and 1/2 rate steps in a uniform packing pattern.

DETAILED DESCRIPTION

In order to indicate which segments of a field contain VSB data and which segments of a field contain E-VSB data, a twelve bit map (MAP) is defined. Of these twelve bits, ten bits are used to define a map and the remaining two bits form half of a four bit frame count. A first map, which may be designated as $MAP_0$, comprises ten bits to define a current map and two of the bits of the four bit frame count. The two frame count bits and the ten bits defining the current map may be distributed in any desired fashion in $MAP_0$. A second map, which may be designated as $MAP_e$, comprises ten bits to define a next map and the remaining two of the bits of the four bit frame count. As before, the remaining two frame count bits and the ten bits defining the next map may be distributed in any desired fashion in $MAP_e$.

Figure 3:
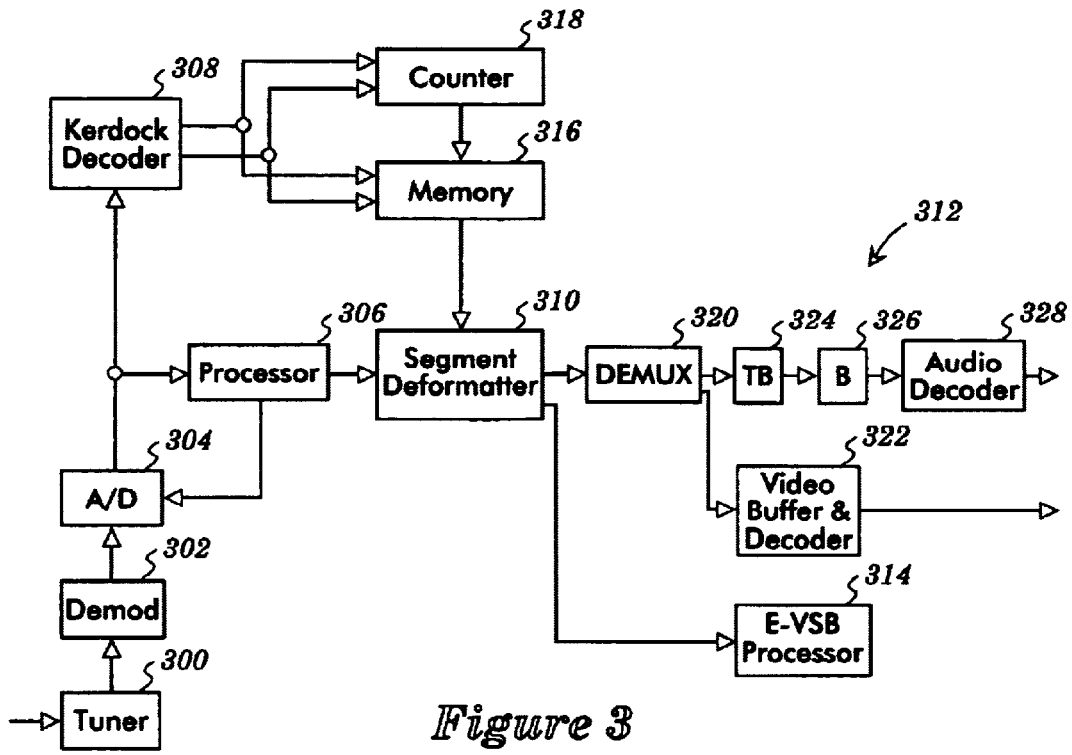
FIG. 3 is a schematic diagram of a receiver that permit maps to be detected.

The current map is the map that the receiver of FIG. 3 uses in determining the location of data in the field of a frame that it is currently receiving, the next map is the map that the receiver will use in determining the location of data in the fields of a future frame, and the frame count indicates the number of frames that the receiver will have to receive before it starts using the next map to determine the location of data in the fields of the future frame. As each field of each frame prior to the future frame is transmitted, the current map and the next map stay the same. However, the frame count is decremented as each of these frames is transmitted. As is known in the art, a frame consists of two fields.

For example, it may be assumed that frame 0 is a first frame to which $MAP_a$ is to be applied as the current map. The transmitter inserts $MAP_a$ into the odd field of frame −1, i.e., the frame that is transmitted prior to frame 0. The transmitter also inserts $MAP_b$, which defines the next map, into the even field of frame −1. The $MAP_a$ and $MAP_b$ inserted into frame −1 also contain the frame count 0. Thus, the current map leads the first frame to which it is to be applied by one frame. The receiver recovers $MAP_a$, $MAP_b$, and the frame count 0 from frame −1, and stores the recovered $MAP_a$, $MAP_b$, and the frame count of 0 in a memory. However, the receiver uses a previously received current map to find data in the frame −1.

In preparing frame 0 for transmission, the transmitter inserts into frame 0 the same maps that it inserted into frame −1, i.e., $MAP_a$ and $MAP_b$. However, the frame count that the transmitter inserts into frame 0 is now k. The receiver stores $MAP_a$, $MAP_b$, and the frame count k that it receives in frame 0. The receiver uses $MAP_a$ to locate data in frame 0.

This process continues such that $MAP_a$ and $MAP_b$ are transmitted in each of the following frames 1, 2, . . . , k−1. The frame count is decremented in each of these frames. When frame k is transmitted, frame k now contains $MAP_b$ as the current map, a new map $MAP_c$ as the next map, and a frame count of 0. Below is a table containing a simplified example of the above operation where k=5.

| Frame # | Frame count | Map data |
|---|---|---|
| −1 | 0 | Current map = map(a,0) next map = map(b,6) |
| 0 | 5 | Current map = map(a,1) next map = map(b,6) |
| 1 | 4 | Current map = map(a,2) next map = map(b,6) |
| 2 | 3 | Current map = map(a,3) next map = map(b,6) |
| 3 | 2 | Current map = map(a,4) next map = map(b,6) |
| 4 | 1 | Current map = map(a,5) next map = map(b,6) |
| 5 | 0 | Current map = map(b,6) next map = map(c,12) |
| 6 | 5 | Current map = map(b,7) next map = map(c,12) |
| 7 | 4 | Current map = map(b,8) next map = map(c,12) |
| 8 | 3 | Current map = map(b,9) next map = map(c,12) |
| 9 | 2 | Current map = map(b,10) next map = map(c,12) |

The frame count is decremented modulo k+1=5. The map changes every k+1 frames. The notation "map(x,y)" refers to a specific map x that will apply to frame #y. As discussed above, the current map leads the frame to which it is to be applied by one frame. The leading is reflected in the map data of the Table. If the location of VSB data and E-VSB data does not change from frame k−1 to frame k, the current map and the next map simply remain the same.

As indicated above, the receiver maintains its own frame count in its memory and also saves the current map and the next map in the memory. As each frame (comprising two fields) is received, the receiver either stores the frame count received in that frame in the memory or decrements the stored frame count by one, as discussed more fully below. Thus, the part of the memory that stores the frame count may be referred to herein as a frame counter or a count down counter. Therefore, if the portion of one or more fields containing the map and frame count information cannot be properly received because of noise in the channel or otherwise, the receiver can determine from its own count down counter when to begin using the next map that it has stored in memory.

The transmitter can insert $MAP_0$ and $MAP_e$ into any desired segment of a corresponding field. For example, the transmitter may be arranged to insert $MAP_0$ into the reserved portion of the field sync segment of an odd field, and the transmitter may be arranged to insert $MAP_e$ into the reserved portion of the field sync segment of an even field.

Figures 1, 2:
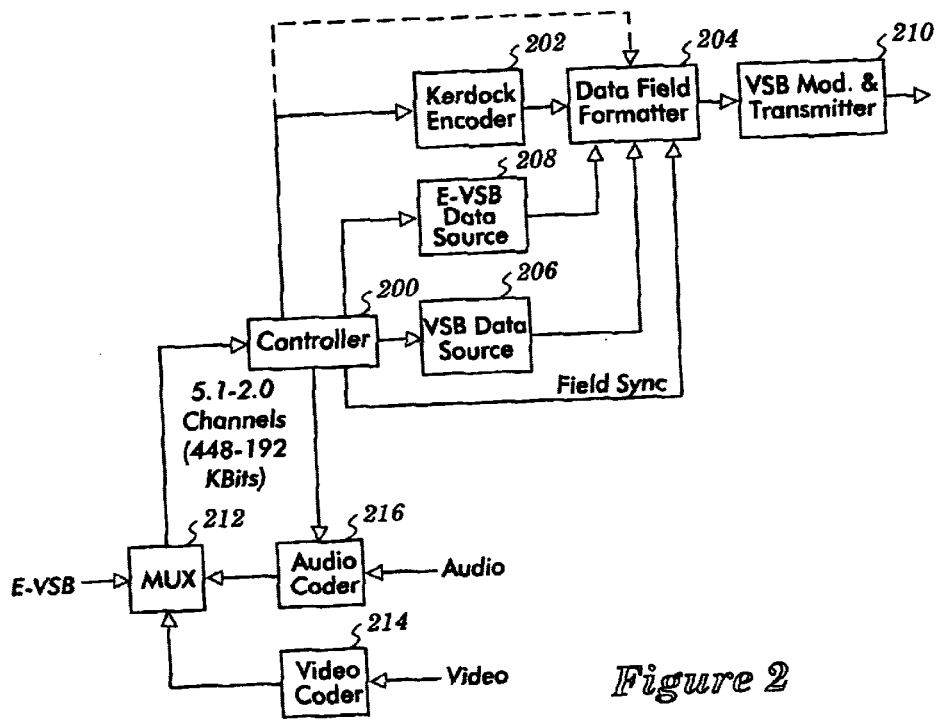
FIG. 1 is a diagram illustrating an exemplary format of a field as defined in the ATSC digital television standard.
FIG. 2 is a schematic diagram of a map insertion system according to one embodiment of the present invention.

As shown in FIG. 2, a controller 200 generates a sequence of maps for application to a Kerdock encoder 202. Twelve bits at a time are supplied to the Kerdock encoder 202. Thus, the first twelve bits supplied to the Kerdock encoder 202 correspond to a first $MAP_0$, the next twelve bits supplied to the Kerdock encoder 202 correspond to a first $MAP_e$, the next twelve bits supplied to the Kerdock encoder 202 correspond to a second $MAP_0$, the next twelve bits supplied to the Kerdock encoder 202 correspond to a second $MAP_e$, and so on. For each twelve bit input, the Kerdock encoder 202 produces a sixty-four bit code word as will be discussed more fully below.

The Kerdock encoder 202 supplies its output to the data field formatter 204. A VSB data source 206 provides VSB data, and an E-VSB data source 208 provides E-VSB data. The controller 200 controls the VSB data source 206 and the E-VSB data source 208 so as to control the mix of VSB and E-VSB data segments in a field according to its corresponding current map. The data segments supplied by the VSB data source 206 and the E-VSB data source 208, together with the encoded map and frame count data from the Kerdock encoder 202, are applied to the data field formatter 204. The data field formatter 204 is synchronized to the field sync signal from the controller 200 and formats the transmitted field so that the sixty-four encoded $MAP_0$ bits are inserted into the reserved portion of a field sync segment of an odd field and so that the sixty-four encoded $MAP_e$ bits are inserted into the reserved portion of a field sync segment of an even field as described above. Thus, the VSB data source 206 and the E-VSB data source 208 are controlled by the controller 200 so that the VSB and E-VSB data segments supplied by the VSB data source 206 and the E-VSB data source 208 to the data field formatter 204 correspond to the current map of $MAP_0$ from the Kerdock encoder 202.

The supply of VSB and E-VSB data segments to the data field formatter as described above may be characterized as a push operation. Alternatively, the data field formatter 204 may pull VSB and E-VSB data segments from the VSB data source 206 and the E-VSB data source 208. In this case, the controller 200 supplies the maps to the data field formatter 204 in addition to the Kerdock encoder 202 as shown by the dashed line in FIG. 2. Accordingly, the data field formatter 204 is synchronized by the maps to pull VSB and E-VSB data segments from the VSB data source 206 and the E-VSB data source 208 and to multiplex them throughout the current field in accordance with the current map $MAP_0$.

The formatted fields are successively applied to a standard ATSC modulator and transmitter 210 for transmission.

A multiplexer 212 supplies the VSB and E-VSB data to the controller 200 which distributes the VSB and E-VSB data to the VSB data source 206 and the E-VSB data source 208, respectively. In this case, the VSB data source 206 and the E-VSB data source 208 may be buffers to hold the VSB and E-VSB data for packing into a field in accordance with a MAP under control of the data field formatter 204. The multiplexer 212 is provided with E-VSB data at one input and is provided with video VSB data and audio VSB data at two other inputs as shown in FIG. 2. The video VSB data is provided to the multiplexer 212 by a video coder 214, and the audio VSB data is provided to the multiplexer by an audio coder 216. The controller 200 controls the audio coder 216 so as to reduce audio related jitter in the receiver, as is discussed more fully below.

As shown in FIG. 3, the signal transmitted by the ATSC modulator and transmitter 210 is received by a receiver comprising a tuner 300. The IF output of the tuner 300 is demodulated by an ATSC demodulator 302 in order to provide an analog baseband output representing the transmitted symbols. This analog signal is sampled by an A/D converter 304 under control of a digital processor 306 to convert the demodulated symbols into corresponding multi-bit digital values. Other arrangements of demodulators, such as where the output of the tuner 300 is digitized before further processing, may also be used. The encoded map and frame count data contained in the field just received are applied to a Kerdock decoder 308 for decoding. The Kerdock decoder 308 Kerdock decodes the encoded map and frame count data.

The Kerdock decoder 308 applies the decoded current map and the decoded next map to a memory 316. The current map that is stored in the memory 316 and that applies to the field being received is supplied to a segment de-formatter 310. The segment de-formatter 310 responds to this current map by passing the VSB segments in the field being received to a VSB processor 312 and by passing the E-VSB segments in the field being received to an E-VSB processor 314. The VSB processor 312 and the E-VSB processor 314 decode and otherwise process the respective VSB data and E-VSB data from the segment de-formatter 310.

Moreover, the Kerdock decoder 308 applies the decoded frame count from the field being received to a count down counter 318. The count down counter 318 may be part of the memory 316. Additionally, the Kerdock decoder 308 applies a reliability factor discussed below to the memory 316 and to the count down counter 318.

If the reliability factor indicates that the current map, the next map, and the frame count contained in the frame being received is reliable, the received frame count is stored in the count down counter 318, and the current map and the next map are stored in the memory 316. On the other hand, if the reliability factor indicates that the current map, the next map, and/or the frame count contained in the frame being received is not reliable because, for example, either or both of the fields being received has been corrupted by noise, two actions are taken. First, the count in the count down counter 318 is decremented modulo k (once per frame) based on frame sync signal timing. Second, the old current map and the old next map are retained in the memory 316, unless the count down counter 318 is decremented to zero. In that case, the current map, which is stored in the memory 316 and which is to be applied to the next received frame, is set to the stored next map, and the next map is left as is.

In this way, the count down counter 318 can keep track of when the next map stored in the memory 316 should be used as the current map. Thus, if the map and the frame count information are not properly received in one or more fields around the transition from current map use to next map use, the receiver, prompted by the count down counter 318, can simply use the next map that is stored in the memory 316. In the example of the table above, if the map and frame count information are not adequately received in the fields of frames 4 and 5, the receiver can simply use map (b,6) that is stored in the memory 316 to locate the various data in the fields of frame 6.

Figure 4:
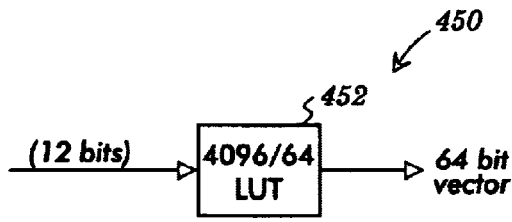
FIG. 4 shows a 64/12 Kerdock encoder that can be used in the map insertion system shown in FIG. 2; and, FIG. 5 shows a 64/12 Kerdock decoder that can be used in the receiver portion shown in FIG. 3.

As described above, the Kerdock encoder 202 may be a 64/12 encoder, and the Kerdock decoder 308 may be a 64/12 decoder. Thus, a non-systematic Kerdock encoder 400 in the form of a 64/12 encoder is shown in FIG. 4 and may be used for the Kerdock encoder 202. The non-systematic Kerdock encoder 400 accepts an input having 12 bits, such as $MAP_0$ having a total of twelve bits, and outputs a corresponding code word having 64 bits by reading out an appropriate 64 bit code word from a look-up table 402.

The look up table 402 stores 4096 Kerdock code vectors each having a length of 64. That is, each of these Kerdock code vectors comprises 64 bits. There are $2^{64}$ different code vectors having a length of 64. However, only $2^{12}$ or 4096 of these $2^{64}$ different code vectors satisfy the requirements for being a Kerdock code vector. These Kerdock vectors are described in "The $Z_4$-linearity of Kerdock, Preparata, Goethals, and Related Codes," by A. Roger Hammons, Jr., P. Vijay Cumar, A. R. Calderbank, N. J. A. Sloane, and Patrick Sole, IEEE Transactions on Information Theory, vol. 40, #2, pp 301–319, March, 1994. Thus, each different combination of the twelve input bits can be used as a unique address into the look up table 402 in order to uniquely select a corresponding one of the 4096 Kerdock code vectors.

When the Kerdock encoder 400 is used as the Kerdock encoder 202 of FIG. 2, the controller 200 supplies two groups of twelve bits per frame to the Kerdock encoder 400. The first group contains the current map and the first two of the four bits that comprise the frame count. The Kerdock encoder 400 uses these twelve bits in the first group as an address into the look up table 402 in order to output a corresponding 64 bit Kerdock Code vector. The data field formatter 204 inserts this 64 bit Kerdock code vector into the odd field of a frame.

The second group contains the next map and the second two of the four bits that comprise the frame count. The Kerdock encoder 400 uses these twelve bits in the second group as an address into the look up table 402 in order to output a corresponding 64 bit Kerdock Code vector. The data field formatter 204 inserts this 64 bit Kerdock code vector into the even field of the frame.

Figure 5:
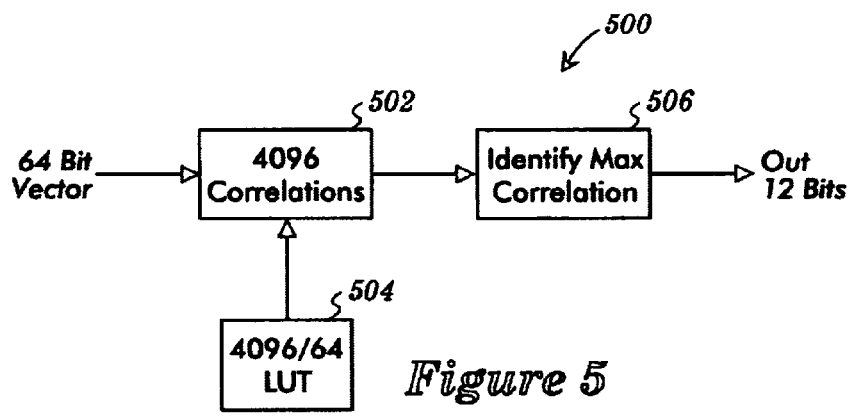

A non-systematic Kerdock decoder 500 is shown in FIG. 5 and may be used for the Kerdock decoder 308. The non-systematic Kerdock decoder 500 accepts an input having 64 bits and outputs a vector of 12 bits that may contain two of the four bits of the frame count in addition to either the current map or the next map.

More specifically, a correlator 502 correlates the 64 input bits with each of 4096 Kerdock code words stored in a look-up table 504. These Kerdock code words may be the same Kerdock code words stored in the look up table 402. The correlation implemented by the correlator 502, for example, may be a dot product of the input 64 bits and each of the Kerdock code words stored in the look-up table 504.

Thus, the first bit of the 64 input bits is multiplied by the first bit of a first Kerdock code word stored in the look-up table 504 to form a first product, the second bit of the 64 input bits is multiplied by the second bit of the first Kerdock code word stored in the look-up table 504 to form a second product, . . . , and the sixty-forth bit of the 64 input bits is multiplied by the sixty-forth bit of the first Kerdock code word stored in the look-up table 504 to form a sixty-forth product. The resulting sixty-four products are added to form a first correlation between the received 64 input bits and the first Kerdock code word stored in the look-up table 504. This process is repeated for each of the other 4095 Kerdock code words stored in the look-up table 504.

An identifier 504 identifies the Kerdock code word from the look-up table 504 that produces the largest correlation, and outputs the twelve bits that correspond to this Kerdock code word as the twelve output bits making up either the current and two of the frame count bits or the next map and the other two frame count bits. The identifier 504 may also form the difference between the largest correlation and the next largest correlation as the reliability factor that indicates the reliability with which the 64 input bits have been decoded.

It is possible to give a particular frame count in the transmitted frames a specialized meaning. For example, a frame count of 1111 can be used to indicate to the receiver that the current map and the next map are the same.

As indicated above, the E-VSB data contained in some segments of a field may be coded with one robust coding rate and the E-VSB data in other segments of the field may be coded at other robust coding rates. For example, the E-VSB data contained in some segments of a field may be coded by a 1/2 rate coder and the E-VSB data in other segments of the field may be coded by a 1/4 rate coder.

In this case, the E-VSB data source 208 supplies 1/2 rate and 1/4 rate coded E-VSB data. The controller 200 controls the VSB data source 206 and the E-VSB data source 208 so as to control the mix of VSB data segments, 1/2 rate coded E-VSB data segments, and 1/4 rate coded E-VSB data segments in a field according to the map information.

The segment de-formatter 310 may include a map decoder that decodes the maps using, for example, a look up table which stores mix and/or location information for each different bit combination for the maps. Alternatively, such a map decoder may use other means such as algorithms to determine the mixes and/or locations of the VSB segments and E-VSB segments, where the E-VSB segments can include 1/4 rate coded E-VSB and 1/2 rate coded E-VSB segments. The look up table and/or algorithms can be stored in the memory 316.

The segment de-formatter 310 receives the field from the digital processor 306 and responds to the decoded mix and/or location information by passing the VSB data segments in the field being received to the VSB processor 312 and by passing the E-VSB data segments in the field being received to the E-VSB processor 314. The VSB processor 312 decodes and otherwise processes the VSB data from the segment de-formatter 310. The E-VSB processor 314 decodes and otherwise processes the E-VSB data from the segment de-formatter 310. In the case where the E-VSB data segments include both 1/4 and 1/2 rate coded E-VSB data segments in the field being received, the E-VSB processor 314 will process the differently coded segments accordingly. For example, in the case where a received frame contains both 1/4 rate coded segments and 1/2 rate coded segments, the E-VSB processor 314 decodes and otherwise processes the 1/4 rate coded E-VSB data from the segment de-formatter 310, and also decodes and otherwise processes the 1/2 rate coded E-VSB data from the segment de-formatter 310 .

As discussed above, there is a potential for packet jitter problems to occur in receivers with unrestricted use of E-VSB. The tradeoff of packets between the VSB (Main) and E-VSB streams causes minor displacement of packets relative to a purely uniform spacing of VSB and E-VSB segments. This displacement tends to increase in the VSB stream as the percentage of E-VSB segments in a field increases. In other words, when the VSB data rate in the receiver gets small as the percentage of E-VSB segments in a field increases, the VSB packets tend to group together. This packet burstiness or packet jitter can cause problems with decoder buffers in a receiver, wherein the buffers may overflow or underflow.

When the VSB data rate decreases, the video rate also decreases. However, the video decoder buffer in the receiver is very large. As a result, there is adequate available space in the video decoder buffer to smooth out the burst of video packets.

On the other hand, because the audio data rate is a small portion of the video rate, a reduction in the audio data rate as the VSB data rate decreases is not required. That is, VSB data rates too low to support good video can still support maximum audio services. However, the audio buffer in the receiver is not large enough to compensate for the maximum burstiness of the audio packets while still supporting maximum audio services.

The maximum allowed audio rate at the output of the audio coder 216 may be set at a predetermined amount such as 448 kbps. The peak amount of jitter in the audio packets will be a portion of the peak jitter in the total VSB stream. This portion has a value equal to the audio rate divided by the VSB (video and audio) rate times the peak jitter of the total VSB stream. This value is different for every mix of VSB and E-VSB streams because the peak jitter of the VSB stream is different for every different mix of VSB and E-VSB segments. The mixes that cause high audio packet jitter correspond to low VSB stream rates which correspond to a low number of VSB segments in a field. That is, high audio packet jitter will result when then are few VSB segments and many E-VSB segments in a field.

Thus, segments mixes with high audio packet jitter correspond to high numbers of E-VSB segments (1/2 rate and/or 1/4 rate coded segments) in a field, where the VSB stream payload is relatively small. The actual mixes that result in an audio packet jitter greater than J, where J for example may be 512 bytes, correspond to total VSB stream rates below a predetermined threshold such as 2.98 Mbps for bursted mapping and 5.97 Mbps for uniform mapping. Bursted mapping involves packing VSB segments and E-VSB segments into a field so that VSB segments clump together in a field and so that E-VSB segments clump together in the field, whereas uniform mapping involves packing VSB segments and E-VSB segments into the field so as to result in a more uniform mixing of the VSB segments and the E-VSB segments throughout the field. However, packing patterns for VSB and E-VSB segments other than bursted and uniform packing patterns may be used.

As stated previously, the amount of audio packet jitter in an elementary stream depends on its percentage utilization of the whole VSB stream and the whole peak jitter of the VSB stream. By limiting the portion of the VSB stream dedicated to audio, the packet jitter in the audio can be reduced. For example, if a predetermined limit such as 192 kbps is imposed on the audio in the VSB stream, then few or no segment mixes result in audio packet jitter greater than a predetermined amount such as 512 bytes. This predetermined limit on the audio stream rate prevents any backward compatibility problems with legacy VSB receivers caused by arbitrary E-VSB usage. By imposing this predetermined limit on audio in a VSB stream when the total VSB bit rate is below a certain threshold such as 2.98 Mbps, backward compatibility is expected to be 100% in the case of bursted packing. For uniform packing, VSB streams below 5.97 Mbps can be accommodated with the same audio bit rate limit.

It is noted that some of the VSB and E-VSB segments mixes could be constrained to 512 bytes of jitter with an audio rate between 192 kbps and 448 kbps. In these cases, a limit of 192 kbps will mean that audio jitter is considerably less than 512 bytes of jitter. This consideration suggests that the predetermined audio rate limit can be increased for these mixes. However, implementation of an audio rate limit may be simplified by using a one-step limit for all cases below the stated VSB stream rate. More graduated restriction is possible, but would be more complicated to specify.

In order to implement this audio limit, the audio coder 216 is controlled by the controller 200 in a well known manner such that, if the MAP indicates a segment mix with many more E-VSB segments than VSB segments, the rate of the audio data supplied by the audio coder 216 to the multiplexer 212 is limited to the predetermined audio limit. As indicated above, an example of this limit is 192 kbps. It will be understood that the full compressed audio bit rate of 448 Kbps corresponds to 5.1 channels of audio while the limited audio bit rate of 192 Kbps corresponds to two channels of audio.

There are a limited number of bits used in the maps to denote segment mixes and/or locations. Therefore, as should be evident from the above description, the maximum number of segment mixes and/or locations that can be denoted by this limited number of bits is less than the number of segment mixes and locations that are possible in a frame containing 312 data segments which can contain any mix of VSB, 1/4 rate coded E-VSB, and/or 1/2 rate coded E-VSB data segments.

Figure 6:
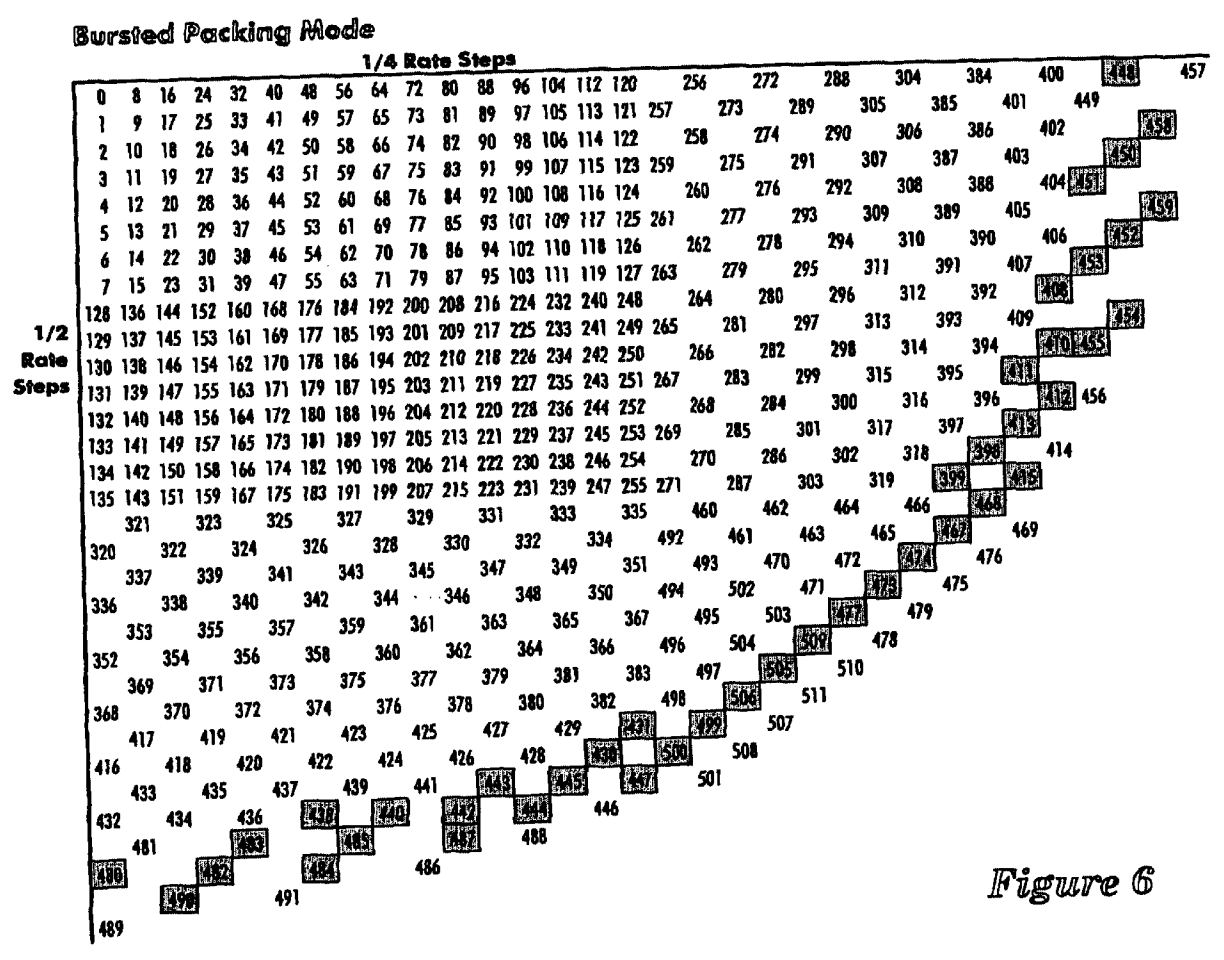

FIG. 6 provides examples of MAP numbers when E-VSB data segments, such as 1/4 rate coded E-VSB and 1/2 rate coded E-VSB data segments, are inserted into a field using bursted packing. These MAP numbers can be used in conjunction with the conversion table of the Appendix to designate the mixes of 1/4 rate coded E-VSB and/or 1/2 rate coded E-VSB data segments in a field. For example, assuming that a map number of 340 shown in FIG. 6 is inserted into a field employing bursted packing of segments, the Appendix shows that the corresponding field contains 112 1/2 rate coded E-VSB data segments and sixteen 1/4 rate coded E-VSB data segments.

Figure 7:
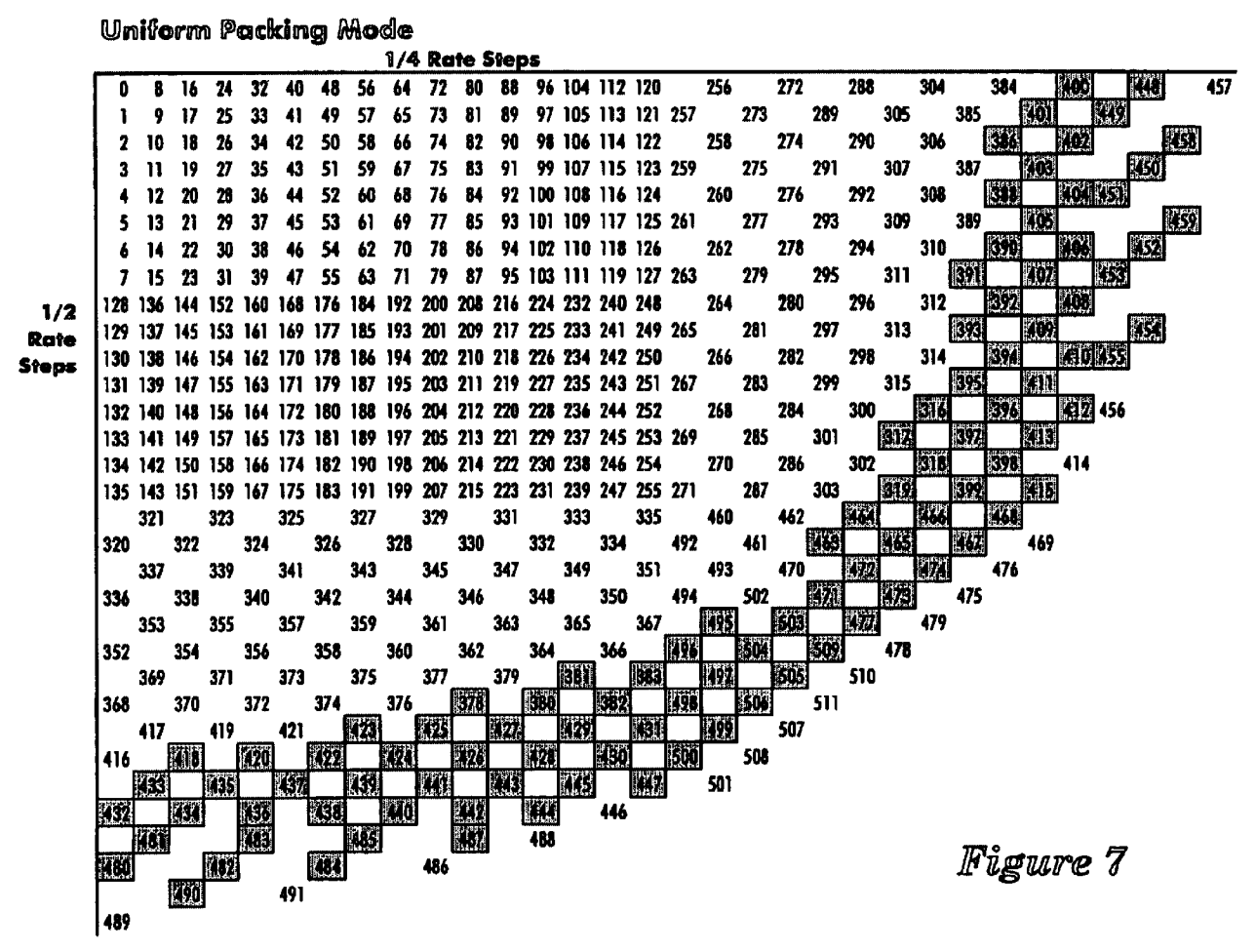

FIG. 7 provides examples of MAP numbers when E-VSB data segments, such as 1/4 rate coded E-VSB and 1/2 rate coded E-VSB data segments, are inserted into a field using uniform packing. These MAP numbers also can be used in conjunction with the conversion table of the Appendix to designate the mixes of 1/4 rate coded E-VSB and/or 1/2 rate coded E-VSB data segments in a field. For example, assuming that a map number of 227 shown in FIG. 7 is inserted into a field employing uniform packing of segments, the Appendix shows that the corresponding field contains forty 1/2 rate coded E-VSB data segments and fifty-two 1/4 rate coded E-VSB data segments.

The MAP numbers that cause high audio packet jitter correspond to low Main stream rates and are identified in FIGS. 6 and 7 by the shaded squares. These are the MAP numbers that trigger use of the predetermined audio rate limit. It is noted that mixes at the extreme lower/right edges of FIGS. 6 and 7, which have a VSB bit rate less than that required for 5.1 channel audio alone, are not shaded.

The MAP numbers that are shaded in FIGS. 6 and 7 correspond to VSB/E-VSB segments mixes where the VSB (Main) stream payload is relatively small. These shaded MAP numbers correspond to VSB stream rates below 2.98 Mbps for bursted mapping and 5.97 Mbps for uniform mapping and result in an audio jitter greater than 512 bytes.

As shown in FIG. 3, the VSB processor 312 includes a demultiplexer 320 that separates the video VSB data from the audio VSB data. The video data is processed by a video buffer and decoder 322. The audio data passes through a transport buffer 324 and then a main buffer 326 before the audio data is decoded by an audio decoder 328. The transport buffer 324 has 512 bytes of storage and is used to compensate for audio packet jitter. The main buffer 326, for example, may have 2,592 bytes of storage and is used to buffer the audio data for the audio decoder 328 in order to synchronize the audio with the video.

Some of the advantages of the limit on the audio rate as described above is that it reduces or eliminates audio packet jitter through use of few limitations on encoder and/or multiplexer parameters, it does not increase encoder complexity, and it requires no changes in encoder design.

Modifications of the present invention will occur to those practicing in the art of the present invention. For example, the blocks that have been described above in relation to the various drawing figures described herein may be hardware blocks, software modules, logic arrays, combinations thereof, etc. Moreover, the arrangements shown in these drawing figures may be implemented as separate blocks as shown, or the blocks may be combined or divided as desired without departing from the scope of the invention.

Also, as described above, the transmitter of FIG. 2 does not change the current map or the next map in the fields of the frame whose frame count is 0 and, instead, makes the map change in frame k+1 whose frame count is reset to k (or other number). Thus, in frame k+1, the previous next map becomes the current map, and a new map is used as the next map. This map change, however, can be made in the frame following the frame whose frame count is 1 or in any other frame. Thus, the frame count that triggers the map change is arbitrary.

Additionally, it is noted that four bits are used to specify the frame count, and that the value of k is thereby limited. However, the map change described above can be delayed by a number of frames greater than k. Indeed, the same current map and next map combination may be inserted into any number of frames greater than k by simply not decrementing k or not decrementing k completely until dk frames later, where d is any number greater than 1. Accordingly, any one or more values of k greater than 0 (or other switch number) can simply be repeated a desired number of times.

Moreover, encoders and decoders using coding and decoding techniques other than Kerdock encoding and decoding may be used in place of the Kerdock encoder 202 and the Kerdock decoder 308.

Furthermore, as described above, $MAP_0$ includes ten current map symbols and two frame count symbols, and $MAP_e$ includes ten next map symbols and the remaining two symbols of the four symbol frame count. These symbols may comprise any number of signal levels. For example, the twelve symbols making up each of the maps may be transmitted using only two signal levels, in which case the symbols may be referred to as bits. However, the map symbols may be transmitted using other numbers of signal levels.

Also, coding rates of 1/4 and 1/2 have described above. However, E-VSB coding rates other than 1/4 and 1/2 may be used in connection with the present invention.

Additionally, the VSB audio data is limited to a predetermined data rate when the VSB data in the field has a VSB data rate below a predetermined threshold. However, instead of using the VSB data rate to trigger the limit on the data rate of the VSB audio data, an E-VSB data rate can be used to limit on the data rate of the VSB audio data. In this case, the VSB audio data can be limited to the predetermined data rate when the E-VSB data in the field has an E-VSB data rate that exceeds an upper predetermined threshold.

Moreover, if audio is transmitted in the E-VSB data stream, audio related jitter can arise if the E-VSB data in the field has an E-VSB data rate below a predetermined threshold. Therefore, the E-VSB audio data may also be limited to a predetermined data rate when the E-VSB data in the field has an E-VSB data rate below a predetermined threshold. However, instead of using the E-VSB data rate to trigger the limit on the data rate of the E-VSB audio data, a VSB data rate can be used to limit on the data rate of the E-VSB audio data. In this case, the E-VSB audio data can be limited to the predetermined data rate when the VSB data in the field has a VSB data rate that exceeds an upper predetermined threshold.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of transmitting a field comprising:
   generating a map for the field, wherein the map indicates a number of E-VSB segments and VSB segments in the field;
   inserting the map into the field;
   inserting E-VSB data into the E-VSB segments of the field;
   inserting VSB data into VSB segments of the field, wherein at least one of the VSB data and the E-VSB data includes audio data;
   limiting the audio data in the at least one of the VSB data and the E-VSB data to a predetermined data rate in response to a corresponding VSB data rate or E-VSB data rate being below a predetermined threshold; and,
   transmitting the field.

2. The method of claim 1 wherein the predetermined data rate comprises 192 kbps.

3. The method of claim 1 wherein the predetermined threshold comprises 2.98 Mbps.

4. The method of claim 1 wherein the predetermined threshold comprises 5.97 Mbps.

5. The method of claim 1 wherein the predetermined data rate comprises 192 kbps, and wherein the predetermined threshold comprises 2.98 Mbps.

6. The method of claim 1 wherein the predetermined data rate comprises 192 kbps, and wherein the predetermined threshold comprises 5.97 Mbps.

7. The method of claim 1 wherein the predetermined data rate comprises 192 kbps, wherein the predetermined threshold comprises 2.98 Mbps for a first packing pattern of the VSB and E-VSB segments in the field, and wherein the predetermined threshold comprises 5.97 Mbps for a second different packing pattern.

8. The method of claim 1 wherein the E-VSB data segments comprise first and second E-VSB segments, and wherein the first and second E-VSB segments contain E-VSB data coded at two different E-VSB coding rates.

9. A method of recovering data from a signal comprising:
   receiving the signal containing a field;
   demodulating the received signal to develop a demodulated signal containing a map indicating a number of E-VSB segments and VSB segments in the field, wherein the E-VSB segments contain E-VSB data, wherein the VSB data segments contain VSB data, wherein the VSB data includes audio data, and wherein the audio data is limited to a predetermined data rate in response to a VSB data rate below a predetermined threshold;
   de-formatting the field according to the map so as to separate the VSB segments and the E-VSB segments; and,
   processing the VSB data in the separated VSB segments in a VSB processor, the processing including buffering the VSB data in a buffer having a size which, in conjunction with the limit of the predetermined data rate, reduces audio jitter.

10. The method of claim 9 wherein the predetermined data rate comprises 192 kbps.

11. The method of claim 9 wherein the predetermined threshold comprises 2.98 Mbps.

12. The method of claim 9 wherein the predetermined threshold comprises 5.97 Mbps.

13. The method of claim 9 wherein the predetermined data rate comprises 192 kbps, and wherein the predetermined threshold comprises 2.98 Mbps.

14. The method of claim 9 wherein the predetermined data rate comprises 192 kbps, and wherein the predetermined threshold comprises 5.97 Mbps.

15. The method of claim 9 wherein the predetermined data rate comprises 192 kbps, wherein the predetermined threshold comprises 2.98 Mbps for a first packing pattern of the VSB and E-VSB segments in the field, and wherein the predetermined threshold comprises 5.97 Mbps for a second packing pattern of the VSB and E-VSB segments in the field.

16. The method of claim 9 wherein the E-VSB data segments comprise first and second E-VSB data segments, and wherein the first and second E-VSB data segments contain data coded at two different E-VSB coding rates.

17. The method of claim 9 wherein the VSB data includes video data, and wherein the processing of the VSB data in the separated VSB segments in a VSB processor comprises:

demultiplexing the audio and video data;

buffering the video data in a video buffer;

decoding the buffered video data;

buffering the audio data in a first audio buffer having a size matching a maximum allowable jitter;

buffering the audio data from the first audio buffer in a second audio buffer that is larger than the first audio buffer; and, decoding the audio data buffered in the second audio buffer.

18. The method of claim 17 wherein the first audio buffer comprises a 512 byte buffer.

19. The method of claim 9 wherein the processing of the VSB data in the separated VSB segments in a VSB processor comprises:

buffering the audio data in a first audio buffer having a size matching a maximum allowable jitter;

buffering the audio data from the first audio buffer in a second audio buffer that is larger than the first audio buffer; and, decoding the audio data buffered in the second audio buffer.

20. The method of claim 19 wherein the first audio buffer comprises a 512 byte buffer.

21. The method of claims 9 further comprising processing the E-VSB data in the separated E-VSB segments in an E-VSB processor.

22. A receiver for recovering data from a signal comprising:

a tuner arranged to tune to the signal containing a field;

a demodulator arranged to demodulate the received signal to develop a demodulated signal containing a map indicating a number of E-VSB segments and VSB segments in the field, wherein the E-VSB segments contain E-VSB data, wherein the VSB data segments contain VSB data, wherein the VSB data includes audio data, and wherein the audio data is limited to a predetermined data rate in response to a VSB data rate below a predetermined threshold;

a segment de-formatter arranged to de-format the field according to the map so as to separate the VSB segments and the E-VSB segments; and, a processor arranged to process the VSB data in the separated VSB segments in a VSB processor, wherein the processor includes a buffer having a size which, in conjunction with the limit of the predetermined data rate, reduces audio jitter.

23. The receiver of claim 22 wherein the predetermined data rate comprises 192 kbps.

24. The receiver of claim 22 wherein the predetermined threshold comprises 2.98 Mbps.

25. The receiver of claim 22 wherein the predetermined threshold comprises 5.97 Mbps.

26. The receiver of claim 22 wherein the predetermined data rate comprises 192 kbps, and wherein the predetermined threshold comprises 2.98 Mbps.

27. The receiver of claim 22 wherein the predetermined data rate comprises 192 kbps, and wherein the predetermined threshold comprises 5.97 Mbps.

28. The receiver of claim 22 wherein the predetermined data rate comprises 192 kbps, wherein the predetermined threshold comprises 2.98 Mbps for a first packing pattern of the VSB and E-VSB segments in the field, and wherein the predetermined threshold comprises 5.97 Mbps for a second packing pattern of the VSB and E-VSB segments in the field.

29. The receiver of claim 22 wherein the E-VSB data segments comprise first and second E-VSB data segments, and wherein the first and second E-VSB data segments contain data coded at two different E-VSB coding rates.

30. The receiver of claim 22 wherein the VSB data includes video data, and wherein the processor comprises:

a demultiplexer arranged to demultiplex the audio and video data;

a video buffer arranged to buffer the video data;

a video decoder arranged to decode the buffered video data;

a first audio buffer arranged to buffer the audio data, wherein the first audio buffer has a size matching a maximum allowable jitter;

a second audio buffer arranged to buffer the audio data from the first audio buffer, wherein the second audio buffer is larger than the first audio buffer; and, an audio decoder arranged to decode the audio data buffered in the second audio buffer.

31. The receiver of claim 30 wherein the first audio buffer comprises a 512 byte buffer.

32. The receiver of claim 22 wherein the processor comprises:

a first audio buffer arranged to buffer the audio data, wherein the first audio buffer has a size matching a maximum allowable jitter;

a second audio buffer arranged to buffer the audio data from the first audio buffer, wherein the second audio buffer is larger than the first audio buffer; and, a decoder arranged to decode the audio data buffered in the second audio buffer.

33. The receiver of claim 32 wherein the first audio buffer comprises a 512 byte buffer.

34. The receiver of claims 22 further comprising an E-VSB processor arranged to process the E-VSB data in the separated E-VSB segments.

* * * * *